United States Patent
Agarwala et al.

(10) Patent No.: US 6,658,503 B1
(45) Date of Patent: Dec. 2, 2003

(54) PARALLEL TRANSFER SIZE CALCULATION AND ANNULMENT DETERMINATION IN TRANSFER CONTROLLER WITH HUB AND PORTS

(75) Inventors: Sanjive Agarwala, Richardson, TX (US); Iain Robertson, Bedfordshire (GB); David A. Comisky, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 574 days.

(21) Appl. No.: 09/713,611

(22) Filed: Nov. 15, 2000

Related U.S. Application Data
(60) Provisional application No. 60/169,434, filed on Dec. 7, 1999.

(51) Int. Cl.$^7$ ................................................ G06F 13/14
(52) U.S. Cl. ........................... 710/35; 710/22; 710/26; 700/20; 708/523
(58) Field of Search ........................... 710/22, 26, 35; 708/523; 700/20

(56) References Cited

U.S. PATENT DOCUMENTS

| | | | | |
|---|---|---|---|---|
| 5,634,076 A | * | 5/1997 | Garde et al. ................. | 395/842 |
| 5,678,064 A | * | 10/1997 | Kulik et al. ................. | 395/848 |
| 6,185,634 B1 | * | 2/2001 | Wilcox ........................ | 710/26 |
| 6,298,366 B1 | * | 10/2001 | Gatherer et al. ............ | 708/523 |
| 6,496,740 B1 | * | 12/2002 | Robertson et al. ............ | 700/20 |
| 6,594,711 B1 | * | 7/2003 | Anderson et al. ............. | 710/22 |

FOREIGN PATENT DOCUMENTS

| GB | 1132823 | * | 9/2001 | ........... G06F/13/38 |
|---|---|---|---|---|

* cited by examiner

*Primary Examiner*—Abdelmoniem Elamin
(74) *Attorney, Agent, or Firm*—Robert D. Marshall, Jr.; W. James Brady, III; Frederick J. Telecky, Jr.

(57) ABSTRACT

The transfer controller with hub and ports originally developed as a communication hub between the various locations of a global memory map within the DSP is described. Using the technique of this invention, parallel size calculation/write annulment decision capability is employed. This technique facilitates the process of setting up complex transfers without risking brute force inefficient processor cycles. Annulment determination allows detection of cases when a set of data cannot be output immediately and the destination pipeline postpones execution of the write command.

4 Claims, 5 Drawing Sheets

PARALLEL TRANSFER SIZE CALCULATION AND ANNULMENT DETERMINATION IN TRANSFER CONTROLLER WITH HUB AND PORTS

This application claims priority under 35 USC §119(e)(1) of U.S. Provisional Application No. 60/169,434, filed Dec. 7, 1999.

TECHNICAL FIELD OF THE INVENTION

The technical field of this invention is digital signal processing and more particularly control of data transfers within a digital signal processing system.

BACKGROUND OF THE INVENTION

Digital signal processing (DSP) differs significantly from general purpose processing performed by micro-controllers and microprocessors. One key difference is the strict requirement for real time data processing. For example, in a modem application, it is absolutely required that every sample be processed. Even losing a single data point might cause a digital signal processor application to fail. While processing data samples may still take on the model of tasking and block processing common to general purpose processing, the actual data movement within a digital signal processor system must adhere to the strict real-time requirements of the system.

As a consequence, digital signal processor systems are highly reliant on an integrated and efficient direct memory access (DMA) engine. The direct memory access controller is responsible for processing transfer requests from peripherals and the digital signal processor itself in real time. All data movement by the direct memory access must be capable of occurring without central processing unit (CPU) intervention in order to meet the real time requirements of the system. That is, because the CPU may operate in a software tasking model where scheduling of a task is not as tightly controlled as the data streams the tasks operate on require, the direct memory access engine must sustain the burden of meeting all real time data stream requirements in the system.

The early direct memory access has evolved into several successive versions of centralized transfer controllers and more recently into the transfer controller with hub and ports architecture. The transfer controller with hub and ports architecture is described in U.K. Patent Application No. 9909196.9 filed Apr. 10, 1999 entitled "TRANSFER CONTROLLER WITH HUB AND PORTS ARCHITECTURE."

A first transfer controller module was developed for the TMS330C80 digital signal processor from Texas Instruments. The transfer controller consolidated the direct memory access function of a conventional controller along with the address generation logic required for servicing cache and long distance data transfer, also called direct external access, from four digital signal processors and a single RISC (reduced instruction set computer) processor.

The transfer controller architecture of the TMS330C80 is fundamentally different from a direct memory access in that only a single set of address generation and parameter registers is required. Prior direct memory access units required multiple sets for multiple channels. The single set of registers, however, can be utilized by all direct memory access requesters. Direct memory access requests are posted to the transfer controller via set of encoded inputs at the periphery of the device. Additionally, each of the digital signal processors can submit requests to the transfer controller. The external encoded inputs are called "externally initiated packet transfers" (XPTs). The digital signal processor initiated transfers are referred to as "packet transfers" (PTs). The RISC processor could also submit packet transfer requests to the transfer controller.

The transfer controller with hub and ports introduced several new ideas concepts. The first was uniform pipelining. New digital signal processor devices containing a transfer controller with hub and ports architecture have multiple external ports, all of which look identical to the hub. Thus peripherals and memory may be freely interchanged without affecting the hub. The second new idea is the concept of concurrent execution of transfers. That is, up to N transfers may occur in parallel on the multiple ports of the device, where N is the number of channels in the transfer controller with hub and ports core. Each channel in the transfer controller with hub and ports core is functionally just a set of registers. This set of registers tracks the current source and destination addresses, the word counts and other parameters for the transfer. Each channel is identical, and thus the number of channels supported by the transfer controller with hub and ports is highly scalable.

Finally the transfer controller with hub and ports includes a mechanism for queuing transfers up in a dedicated queue memory. The TMS320C80 transfer controller permitted only was one transfer outstanding per processor at a time. Through the queue memory provided by the transfer controller with hub and ports, processors may issue numerous transfer requests up to the queue memory size before stalling the digital signal processor.

SUMMARY OF THE INVENTION

The transfer controller with hub and ports has undergone significant refinements in implementation that followed the original description in U.K. Patent Application No. 9909196.9 field Apr. 10, 1999 entitled "TRANSFER CONTROLLER WITH HUB AND PORTS ARCHITECTURE." One such refinement is the use of parallel transfer size calculation and annulment determination. Without this technique, the process of setting up transfers would involve more complex and inefficient cut and try methodology involving excessive loss of processor cycles.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
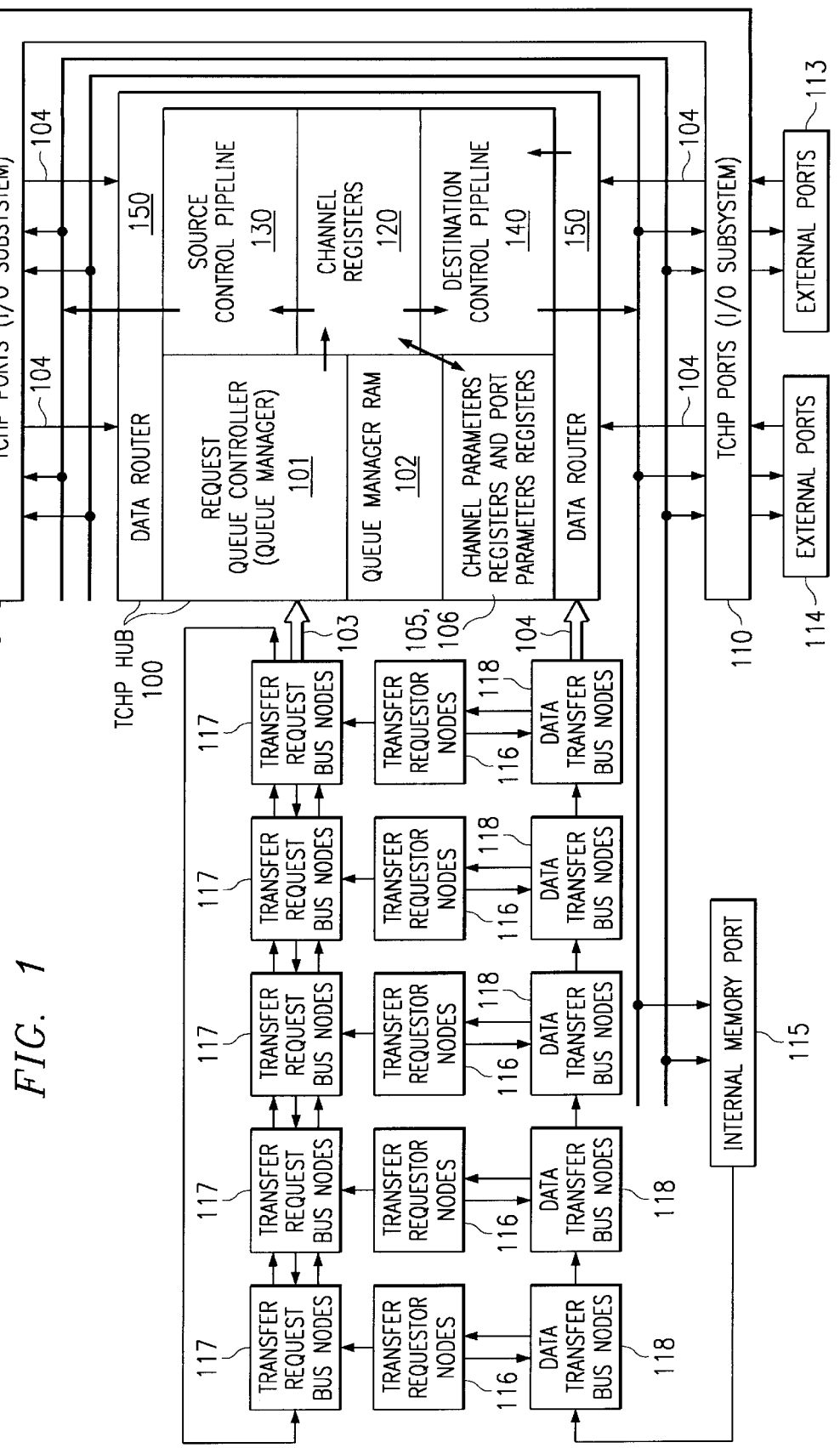
FIG. 1 illustrates in a functional block diagram the basic principal features of the transfer controller with hub and ports architecture and related functions.

The transfer controller with hub and ports transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115.

The transfer controller with hub and ports functions in conjunction with a transfer request bus having a set of nodes 117, which bring in transfer request packets at input 103. These transfer request bus nodes individually receive transfer requests packets from transfer requesters 116 which are processor-memory nodes or other on-chip functions which send and receive data.

Secondly, the transfer controller uses an additional bus, the data transfer bus having a set of nodes 118, to read or write the actual data at the requestor nodes 116. The data transfer bus carries commands, write data and read data from a special internal memory port 115 and returns read data to the transfer controller hub via the data router 150 at inputs 104.

The transfer controller has, at its front-end portion, a request queue manager 101 receiving transfer requests in the form of transfer request packets at its input 103. Request queue manager 101 prioritizes, stores and dispatches these as required.

Request queue manager 101 connects within the transfer controller hub unit 100 to the channel request registers 120 which receive the data transfer request packets and process them. In this process, request queue manager 101 first prioritizes the transfer request packets and assigns them to one of the N channel request registers 120. Each of the N channel request registers 120 represents a priority level.

If there is no channel available for direct processing of the transfer request packet, it is stored in the queue manager memory 102. Queue manager memory 102 is preferably a random access memory (RAM). The transfer request packet is then assigned at a later time when a channel becomes available. The channel registers interface with the source 130 and destination 140 control pipelines which effectively are address calculation units for source (read) and destination (write) operations.

Outputs from these pipelines are broadcast to M ports through the transfer controller ports I/O subsystem 110. I/O subsystem 110 includes a set of hub interface units, which drive the M possible external ports units. Four such external ports are shown in FIG. 1 as external ports 111 through 114. The external ports units (also referred to as application units) are clocked either at the main processor clock frequency or at a different external device clock frequency. The external device clock frequency may be lower than or higher than the main processor clock frequency. If a port operates at its own frequency, synchronization to the core clock is required.

As an example of read-write operations at the ports, consider a read from external port node 112 followed by a write to external port node 114. First the source pipeline addresses port 112 for a read. The data is returned to the transfer controller hub through the data router 150. On a later cycle the destination control pipeline addresses port 114 and writes the data at port 114. External ports as described here do not initiate transfer requests but merely participate in reads and writes requested elsewhere on the chip. Read and write operations involving the processor-memory (transfer requesters) nodes 116 are initiated as transfer request packets on the transfer request bus 117. The queue manager 101 processes these as described above. On a later cycle a source pipeline output (read command/ address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150. On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

Figure 2:
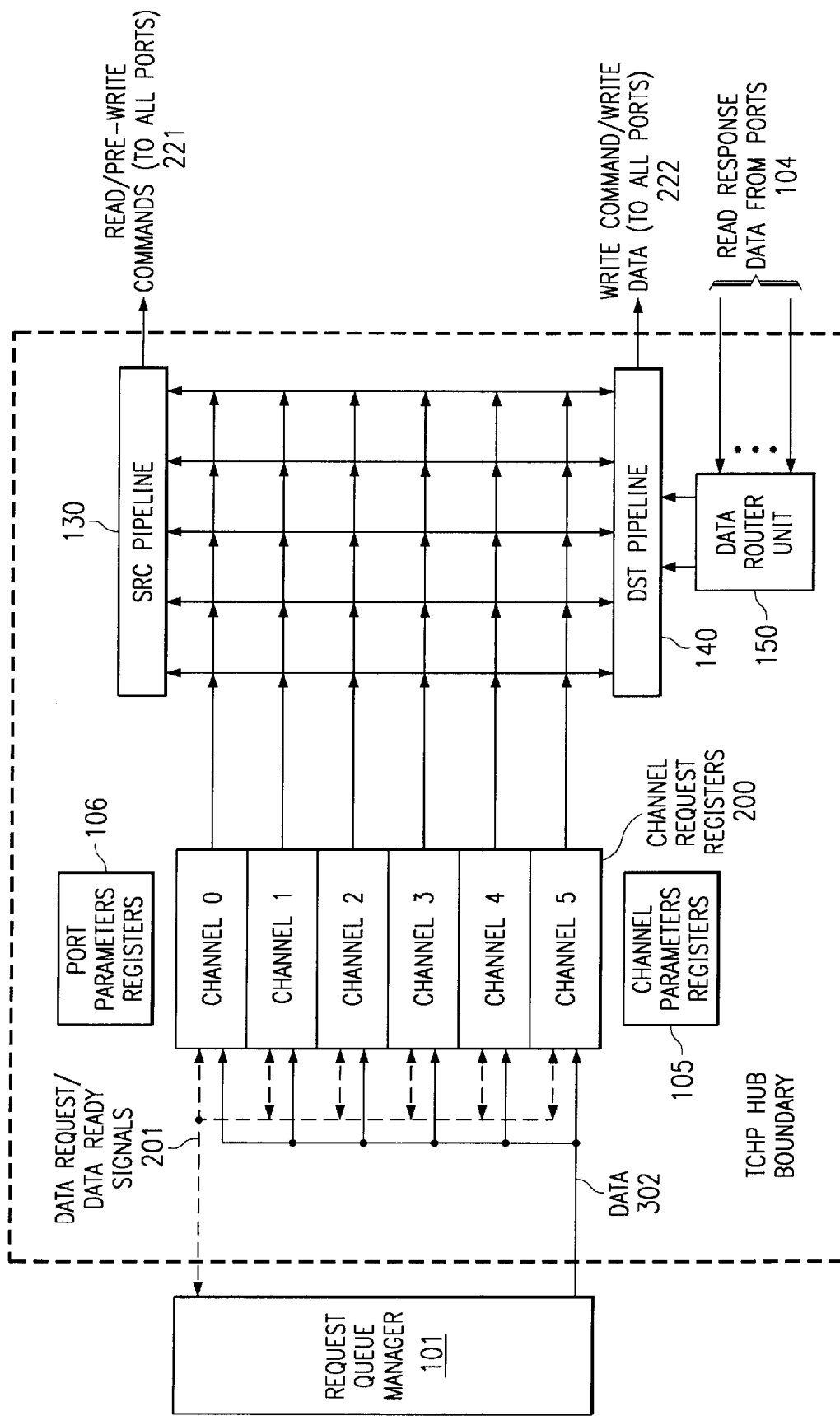
FIG. 2 illustrates the queue manager interface to the transfer controller hub unit.

FIG. 2 illustrates the interface of request queue manager 101 to the transfer controller hub unit boundary and particularly the request queue manager communications with the channel request registers 200, channel parameter registers 105 and port parameters registers 106. Channel parameters registers 105 and port parameters registers 106 store critical data regarding for example, types of transfers, mode information, status, and much other information critical to the transfer process.

Channel request registers 200 pass information used in the source control pipeline 130 for generation of the read/pre-write commands 221. Similarly, channel request registers 200 pass information used in the destination control pipeline 140 for the generation of write command/write data words 222. Read response data 104 from the ports is returned to the destination pipeline via the data router 150.

Figure 3:
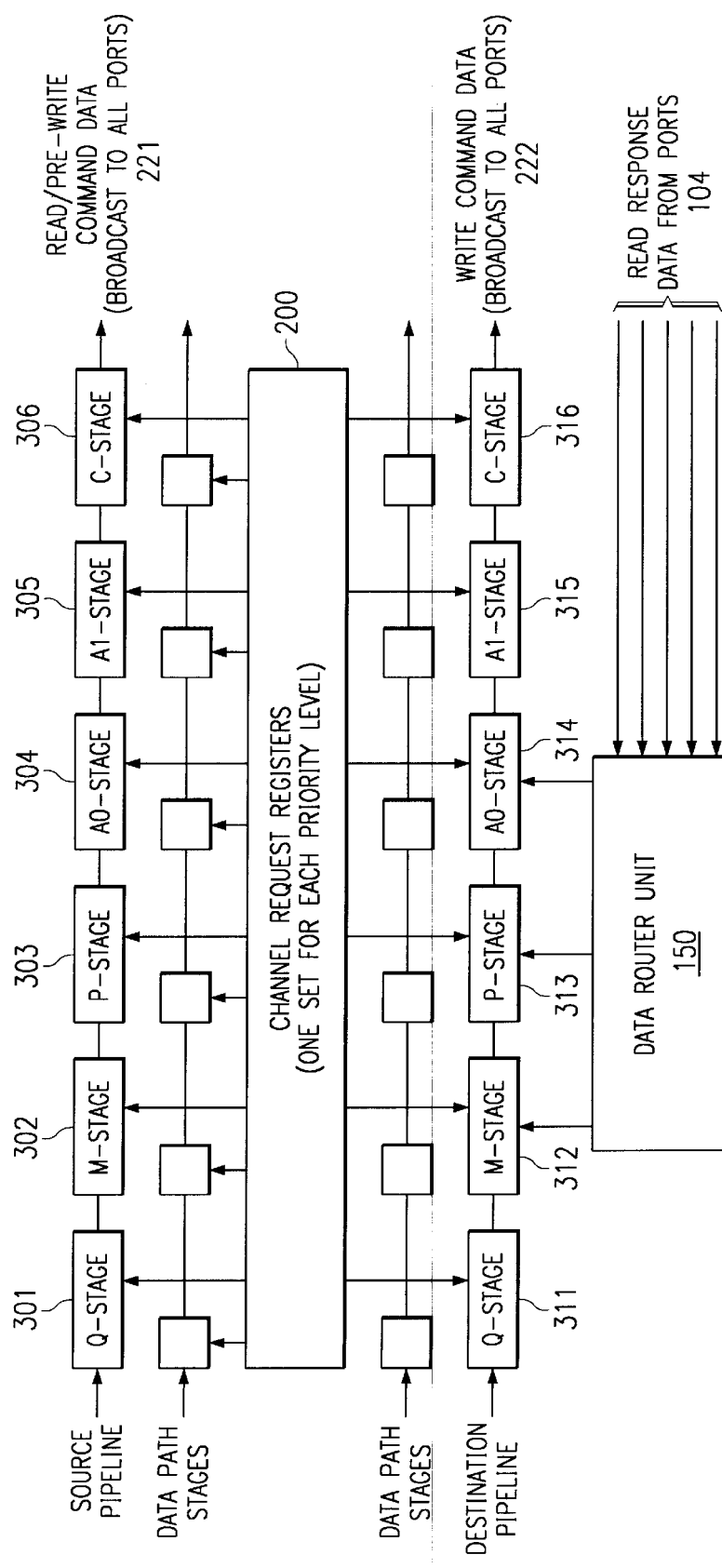
FIG. 3 illustrates the transfer controller source and destination operational pipelines.

FIG. 3 illustrates the possible pipelines in a transfer controller implementation. Table 1 shows the particular tasks performed during the pipeline stages in the preferred embodiment. In specific implementations, one or more stages may be combined but the tasks for the individual pipeline stages are essentially as shown in Table 1.

TABLE 1

| Pipeline Stage | Function |
| --- | --- |
| Q | Interrogates state of queues within ports |
| M | Maps port ready signals to channels |
| P | Prioritize highest priority channel with ready ports |
| A0 | First half of address update cycle |
| A1 | Second half of address update cycle |
| C | Issues command to ports |

The channel request registers 200 pass information used in the source pipeline stages 301 to 306 for generation of the read/pre-write commands 221. Similarly, the channel request registers 200 pass information used in the destination pipeline stages 311 to 315 for the generation of write command/write data words 222. Read response data 104 from the ports is returned to the destination pipeline via the data router 150.

This invention describes an important technique not fully developed during the time of the earlier transfer controller with hub and ports architecture. This extremely important technique is the solution to making transfer size calculation in parallel with annulment decisions. The transfer controller hub 100 requires its own set of counters in order to fully utilize the queues, rather than waiting multiple cycles determined by difference between "port ready" and "address/ write counter" updates. The pipeline M-stages of the use the current queue counter values, and generate a new one based on which port and what type of operation was selected in the pipeline P-stage. Also taken into account is the queue counter increment signal from the pipeline Q-stage registered from the port, as well as increments from the pipeline A-stages if they resulted in an annulled operation. These counters are updated every cycle and are registered, in straightforward fashion, every cycle inside the port parameters registers.

The transfer controller with hub and ports source control pipeline 130 and destination control pipeline 140 are designed to provide optimum performance with minimum hardware cost. The transfer controller with hub and ports may run at the high internal clock frequency of the chip core while supporting much of the total bandwidth of all the attached memories. This leads to the need for a deep pipeline with a small amount of logic per stage, a method of performing multiple transfers between different ports simultaneously, and a way of quickly reacting to changes in the ports to support higher bandwidth.

Referring again to FIG. 3, as noted transfer controller hub 100 has two pipelines, source control pipeline 130 with stages 301 to 306 and destination control pipeline 140 with stages 311 to 316. Fundamentally, there are six logical stages to each pipeline, each of which may be partitioned into one or more cycles as the design requirements and capabilities allow. The six logical stages of source control pipeline 130 are Q-stage 301, M-stage 302, P-stage 303, A0-stage 304, A1-stage 305 and C-stage 306. The six logical stages of destination control pipeline 140 are Q-stage 311, M-stage 312, P-stage 313, A0-stage 314, A1-stage 315 and C-stage 316.

Destination control pipeline 140 receives data from the source port and outputs write command data 222 to the destination port. Once the data router unit 150 gets the data, there is a possibility the set of data cannot be output immediately. If this happens, then destination pipeline 140 must annul that write command, hold the data that is already stored in the data router unit 150. In the destination pipeline A1-stage 315, an annul detection unit checks all the cases that would cause the write command to annul.

While the destination pipeline Q-stage 311, M-stage 312, and P-stage 313 perform the channel multiplexing, the pipeline A0-stage 314 and A1-stage actually perform the address calculations, update transfer information, and generate the next write command for the ports. The main goal of A0-stage 314 and A1-stage 315 is to take the current state of the transfer writes, calculate the state for the next write in the transfer, and send the current information off to the ports.

Before discussing in detail the address generation of the destination pipeline A0-stage and A1-stage, which are very complex, it is helpful to review the simplified version given here. An address and word count are required outputs of each address unit and these outputs update the selected channel, given the size of the transfer to be performed. The complexity of address generation within the transfer controller with hub and ports is increased by the need to accommodate both normal linear transfers and two dimensional transfers.

Figure 4:
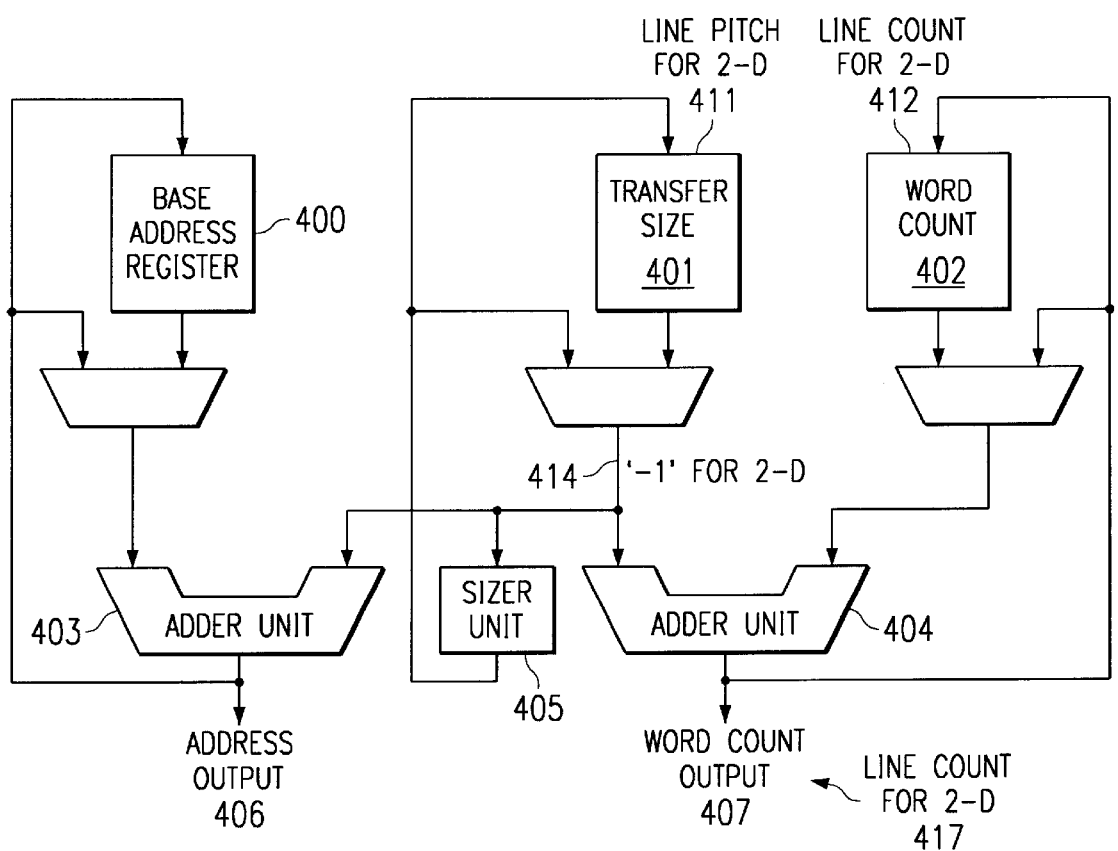
FIG. 4 illustrates the source address and word count calculation unit of the present invention.

FIG. 4 illustrates hardware for the source and destination address calculation. Normal linear transfers are simple single word or one dimensional word transfers. These have address generation which proceeds in a straightforward fashion. The source address/word count calculation unit includes source base address register 400, source transfer size (interval) address register 401 and source word count base register 402. Source address adder unit 403 calculates next source address by adding source base address register 400 to source transfer size (interval) address register 401 and storing sum in source address base register 400. Source word count adder unit 404 calculates remaining word count by subtracting transfer size register 401 from word count base register 402 and storing difference in source word count base register 402. A destination address/word count calculation unit includes the same basic hardware and operates in like manner. The destination address/word count calculation unit includes destination base address register 400, destination transfer size (interval) address register 401, destination word count base register 402. Destination address adder unit 403 calculates the next destination address by adding destination base address register 400 to destination transfer size (interval) address register 401 and storing sum in destination address base register 400. The destination word count adder unit 404 calculates remaining the word count by subtracting transfer size register 401 from word count base register 402, and storing difference in destination word count base register 402.

Two dimensional (2-D) transfers are transfers of a number of identically sized lines, the length of each line, number of lines, and first word offset values defined by word count, line count, and line pitch parameters, respectively. Two dimensional transfers may take place in the following permutations: on-chip 1-D to off-chip 2-D memory transfers; off-chip 2-D to on-chip 1-D memory transfers; and off-chip 2-D to off-chip 2-D transfers. In 2-D transfers the channel performs patch adjust cycles the transfer size 401 becomes instead a line pitch 411 and the word count 402 becomes a line count 412. Line count decrement uses adder 404 with −1 as the left-most input 414. Sizer unit 405 also has additional hardware to accommodate the additional parameters and operations involved in the 2-D transfer.

The general address unit of FIG. 4 performs the necessary calculations to update the address and element count for the selected channel, given the size of the transfer to be performed. Adder units can 403 and 404 can perform two different operations each, depending on whether the channel is sending a command to a port or performing a patch adjust cycle for multi-dimensional transfers. If a direction field in the transfer request packet indicates that the transfer controller with hub and ports is performing reverse/fixed addressing, then adder unit 403 subtracts the transfer size from the input address. Otherwise, it adds the transfer size to the input address. Adder unit 404 subtracts the size from the remaining element count. Separate registers are not necessary for base address register 400 and transfer size register 401. The address and element count can come from the register file source address/element count for reads, or destination address/element count for writes.

Figure 5:
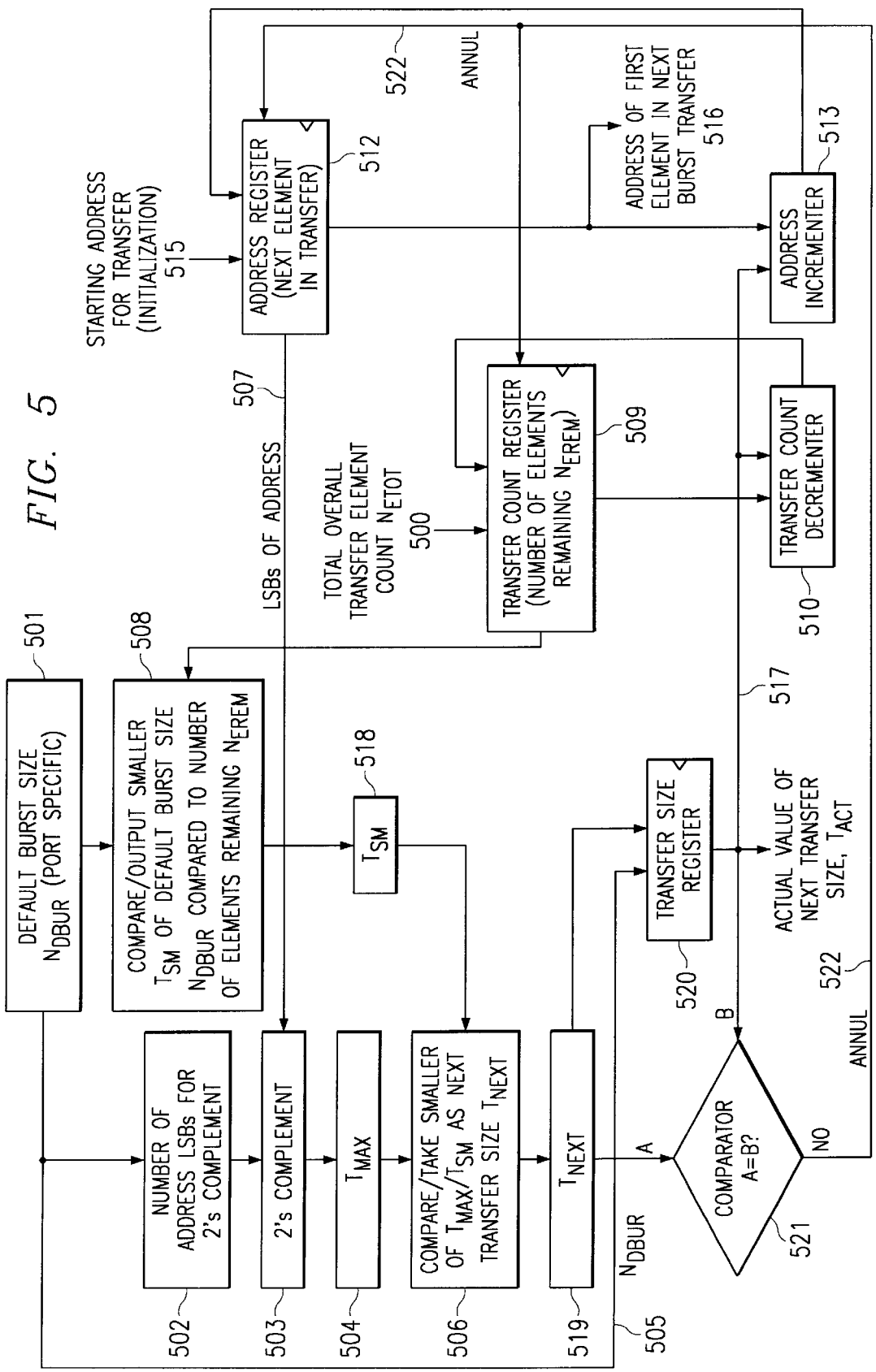
FIG. 5 illustrates the parallel size calculation and annulment determination.

FIG. 5 illustrates the steps in the process of making a next transfer size calculation and a write annulment decision in parallel. When initiating a transfer, the transfer controller hub 100 must determine how large the transfer can be. The total size of a requested transfer $N_{ETOT}$ is the total number of elements/words which have been requested as a complete transfer from one port location to another. This overall transfer may consist of a number N of individual transfers, which have a number of elements $N_{EX}$ which may vary from one element to the next, particularly for the first and last transfers. The maximum value of $N_{EX}$ is labeled $N_{DBUR}$ which is preferably the default burst size. The default burst size is the normal number of elements transferred in a burst. These individual transfer sizes $N_{E1}$ through $N_{EN}$ sum to the total element size $N_{ETOT}$. Each element to be transferred has a unique starting address. The individual portions $N_{EX}$ of the transfer will take place in bursts having a transfer size equal to the $N_{EX}$ starting at a given address which may or may not be at a burst boundary.

FIG. 5 illustrates the parallel burst size calculation and annul decision in block diagram form. Default burst size register 501 is initialized with the default burst size $N_{BBUR}$ 505. This default burst size $N_{BBUR}$ 505 will typically vary by port and the device connected to that port. This default burst size $N_{BBUR}$ 505 is also initially loaded into transfer size register 520. The total transfer element count $N_{ETOT}$ 500 is initially loaded into transfer count register 509. The data transfer starting address 515 is initially loaded into address register 512.

The transfer size of an actual transfer $N_{EX}$ is affected by three factors. These are:

(1) The default burst size $N_{DBUR}$ stored in default burst size register 501 for the destination port;

(2) The number of elements remaining to be transferred $N_{EREM}$ store in transfer count register 509; and (3) The alignment of the address with respect to the default burst size.

This last item requires examination of the least significant bits of the address to determine how successive transfers can be aligned on a burst boundary. In general, the first access within the data transfer may be less than the default burst size. This will be the case if the address is not initially aligned to a burst boundary. Because burst data transfers are more efficient, it is advantageous to get the address aligned as soon as possible. Also, the last access within the data transfer may be less than the default burst size $N_{DBUR}$. This will be the case if the transfer does not end on a burst boundary.

The maximum transfer size allowed by the address is $T_{MAX}$ 504. This is determined by taking the 2's complement of the appropriate number 502 of address least significant bits 507. The appropriate number 502 is determined by the default burst size 501. Note that the default burst size can vary among the ports depending on the internal or external device connected to the port. Therefore default burst size register 501 is a read/write register loaded with the default burst size for the destination port of the current data transfer. For example, if the default burst size $N_{DBUR}$ 505 is 8 elements, then the number of address least significant bits 501 is 3. Thus 2's complement unit 503 forms the 2's complement of 3 least significant bits of address least significant bits 507. If the default burst size $N_{DBUR}$ 505 is 16 elements, then the number of address least significant bits 501 is 4. Here are some specific examples. If the default burst size $N_{DBUR}$ 505 is 8, and the 3 least significant bits of the address are 001, then 7 elements can be transferred. If the default burst size $N_{DBUR}$ 505 is 8 and the 3 least significant bits are 101, then 3 elements can be transferred. If the default burst size $N_{DBUR}$ 505 is 16 and the 4 least significant bits are 1000 then 8 elements can be transferred. The 2's complement unit 503 requires a subtractor of width up to the maximum burst size. Because the burst size is variable from port to port, some conditional masking as determined by number of address bits 502 is also required.

In parallel, comparator 508 selects the smaller of the default burst size $N_{DBUR}$ 505 from default burst size register 501 or the number of elements remaining $N_{EREM}$ from transfer count register 509. The result is labeled $T_{SM}$ 518. Because the default burst size $N_{DBUR}$ 505 is an integral power of 2, comparator 508 can include a zero-detector of the appropriate number of most significant bits of the remaining element count 509 and some multiplexers. Comparator 506 determines the calculated next transfer size. Comparator 506 compares $T_{SM}$ 518 and $T_{MAX}$ 504 and selects the smaller of these two values. This smaller value $T_{NEXT}$ 519 is stored in the transfer size register 520 as the actual transfer size $T_{ACT}$ 517.

Following determination of the actual transfer size $T_{ACT}$ 517, the address and word counts are updated. Address incrementer 513 adds the actual transfer size $T_{ACT}$ 517 to the current address in address register 512. Transfer count decrementer 510 subtracts the actual transfer size $T_{ACT}$ 517 the remaining element in transfer count register 509. This prepares for the next transfer. The transfer controller with hub and ports performs the address increment and element transfer count decrements using the actual transfer size $T_{ACT}$ 517. Initially, this is the default burst size $N_{DBUR}$ 505. During this address and element count update, the transfer controller with hub and ports calculates the next input $T_{NEXT}$ 519 using blocks 502, 503, 508, 509 and 506 to be stored in register 520 and become the actual transfer size $T_{ACT}$ 517.

Comparator 521 compares the actual transfer $T_{ACT}$ 517 with the calculated next transfer size $T_{NEXT}$ 519. If the actual transfer size $T_{ACT}$ 517 matches the calculated next transfer size $T_{NEXT}$ 519, the write operation proceeds normally. If the actual transfer size $T_{ACT}$ 517 does not match the calculated next transfer size $T_{NEXT}$ 519, then the write operation is annulled. The transfer count register 520 is updated with the calculated next transfer size $T_{NEXT}$ 519. On annulment, annul signal 522 inhibits the write operation, the update of address register 512 and the update of transfer count register 509.

The annulment condition remains until transfer size register 520 is updated with the calculated next transfer size $T_{NEXT}$ 519. Thereafter, comparator 521 detects a match and the annul signal 522 goes inactive. Whenever a transfer size which does not match the default burst size is used successfully, the transfer size register 520 is re-initialized with the default burst size $N_{DBUR}$ 505. This is the most likely to match for the next transfer. By performing the transfer size calculation in parallel with the address/count adjustments, rather than in tandem, single cycle throughput is possible.

Consider an example. Suppose the address is initially not on a burst size boundary. Suppose also that the element count $N_{ETOT}$ is at least several times the default burst sizes $N_{DBUR}$ 505, and the transfer will not end on a burst boundary. The first attempt to perform the first access is annulled because the transfer size register 520 holds the initialization value $N_{DBUR}$ 505 and this attempted transfer size does not match the computed next transfer size $T_{NEXT}$ 519 ($T_{ACT}$=$N_{DBUR}$ is not equal to $T_{NEXT}$). The transfer size register 520 is then updated with calculated next transfer size $T_{NEXT}$ 519. On the next attempt, the access is successful because actual transfer size $T_{ACT}$ 517 used matches the calculated next transfer size $T_{NEXT}$ 519. The successful transfer causes the transfer register 520 to be updated with default burst size $N_{DBUR}$ 505. The address register 512 and transfer count register 509 also update. The next several accesses proceed without annulment because the transfer size equals the default burst size ($T_{ACT}$=$T_{NEXT}$=$N_{DBUR}$) The last access is initially annulled because the calculated next transfer size $T_{NEXT}$ 519 equals the remaining transfer count and is not the default burst size $N_{DBUR}$ 505. The transfer count is updated with he calculated next transfer size $T_{NEXT}$ which is smaller than $N_{DBUR}$ and is equal to the smaller number of elements remaining ($T_{NEXT}$=$N_{EREM}$). The last access completes successfully with transfer $T_{ACT}$=$N_{EREM}$. The transfer count is then updated with default burst size, ready for the next overall transfer $N_{ETOT}$.

What is claimed is:

1. A data transfer controller comprising:

a plurality of ports, each port having a default burst size;

a default burst size register storing said default burst size of a predetermined port;

an address register storing a next data address, said address register initially storing a data transfer start address;

a transfer count register storing a transfer count of remaining data to be transferred, said transfer count register initially storing a word count of a number of words of said data transfer;

a transfer size register storing a data transfer size, said transfer size register initially storing a data transfer size equal to said default burst size stored in said default burst size register;

a first comparator having a first input connected to said default burst size register, a second input connected to said transfer count register and an output supplying the least of said default burst size and said transfer count;

a two's complement unit connected to said default burst size register and said address register, said two's complement unit forming a two's complement of a number of least significant bits of said address store in said address register, said number of least significant bits corresponding to said default burst size;

a second comparator having a first input connected to said two's complement unit, a second input connected to said first comparator, and an output generating the least of said two's complement and said output of said first comparator; and a third comparator having a first input connected to said output of said second comparator and a second input connected to said transfer size register, said third comparator operating in data transfer cycles, enabling data transfer at said next data address in an amount equal to said data transfer size for any data transfer cycle when said output of said second comparator equals said data transfer size and annulling data transfer for any data transfer cycle when said output of said second comparator does not equals said data transfer size.

2. The data transfer controller of claim 1, further comprising:

an address adder having a first input connected to said address register, a second input connected to said transfer size register and an output connected to said address register, said address adder connected to said third comparator and adding said data transfer size to said next data address and storing the sum in said address register for any data transfer cycle when said output of said second comparator equals said data transfer size;

a transfer counter subtractor having a first input connected to said transfer count register, a second input connected to said transfer size register and an output connected to said transfer count register, said transfer count subtractor connected to said third comparator and subtracting said data transfer size from said transfer count and storing the difference in said transfer count register for any data transfer cycle when said output of said second comparator equals said data transfer size.

3. The data transfer controller of claim 1, wherein:

said transfer size register is connected to said output of said second comparator to store said output therein in a next data transfer cycle.

4. The data transfer controller of claim 1, wherein:

said transfer size register is connected to said default burst size register to store said default burst size therein in a next data transfer cycle following any data transfer cycle when said output of said second comparator equals said data transfer size and said data transfer size does not equal said default burst size.

\* \* \* \* \*